US006925540B2

(12) United States Patent
Hawkins

(10) Patent No.: US 6,925,540 B2
(45) Date of Patent: Aug. 2, 2005

(54) SYSTEMS AND METHODS FOR CHASSIS IDENTIFICATION

(75) Inventor: Pete A. Hawkins, San Luis Obispo, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 10/138,971

(22) Filed: May 2, 2002

(65) Prior Publication Data

US 2003/0208656 A1 Nov. 6, 2003

(51) Int. Cl.[7] .............................................. G06F 12/00
(52) U.S. Cl. ..................... 711/161; 711/114; 711/156; 714/45; 714/723
(58) Field of Search .................................. 711/114, 115, 711/103, 156, 161–162; 714/45, 723

(56) References Cited

U.S. PATENT DOCUMENTS 6,073,251 A * 6/2000 Jewett et al. .................. 714/7
6,625,703 B2 * 9/2003 Goodman et al. ........... 711/162
6,662,268 B1 * 12/2003 McBrearty et al. ......... 711/114

* cited by examiner

Primary Examiner—Matthew D. Anderson
(74) Attorney, Agent, or Firm—Blakely, Sokoloff, Taylor & Zafman LLP

(57) ABSTRACT

A identification system comprising at least one non-volatile memory device containing identification data, a communication bus for the memory device that is independent of any other system bus, and a controller to manage the integrity of the identification data.

16 Claims, 3 Drawing Sheets

SYSTEMS AND METHODS FOR CHASSIS IDENTIFICATION

BACKGROUND OF THE INVENTION

1. Field of the Invention

The invention relates generally to the field of high availability electronic systems, and, more specifically, to the identification of chassis within such systems.

2. Background of the Invention

High availability systems are presently used in applications where systems are required to operate with little or no interruption of service. The telecommunications and data markets, for example, have many applications for high availability systems including central office switches, private branch exchanges (PBX), internet routers, and digital subscriber loops (DSL). Standards have been developed to facilitate communication between high availability system components built by different manufacturers.

One example of a prior art high availability system is CompactPCI. Standards for CompactPCI products are agreed to by PCI Industrial Computers Manufacturers Group (PICMG). A CompactPCI product has, among other things, a metal cover that encloses a chassis, a backplane, and slots for printed circuit boards that perform specific applications. A general description of CompactPCI can be found in PICMG 2.0 R2.1, CompactPCI Specification Short Form, published Sep. 2, 1997. A more complete description of CompactPCI can be found in PICMG 2.0 R3.0, CompactPCI Specification, published Oct. 1, 1999. Any system component that can be replaced in the field by a technician is known by one of ordinary skill in the art as a Field Replaceable Unit (FRU). In a high availability system there are, typically, mechanisms for compensating for a failure, such as, for example, redundancy. When an FRU (component or a circuit board) fails within a high availability system that has been placed in the field, it is important to notify a service provider of the failure so that the system can be repaired.

In telecommunications applications, for example, a company may have thousands of unattended systems deployed in racks all over the world. Furthermore, there may be many different chassis stacked in these racks. Before a service provider can send a technician to repair a failure, more must be communicated than simply the fact that a failure has occurred somewhere in the field. The identity of the failed chassis must be determined. A prior art means for identifying a failed chassis is disclosed in the Intelligent Platform Management Interface (IPMI) Specification version 1.5, published Feb. 21, 2001. Permission to license the IPMI specification document can be obtained from Intel Corp., Hewlett-Packard Company, NEC Corp., and Dell Computer Corp.

A product complying with IPMI may have an identification module having an Electrically Erasable Programmable Read Only Memory (EEPROM) that contains at least some identifying information that is unique to the chassis. The data stored in the EEPROM is called the chassis information. An EEPROM used to store the chassis information is called the FRU memory device (the FRU term denotes that the memory device is replaceable in the field). The chassis information is written to the EEPROM at the factory may include, among other things, the chassis serial number, date of manufacture, model number, vendor information, and product number. Blank fields may also be available for the end user to write other identification information that may be useful, such as a string or text describing the geographical location of the chassis. If a failure occurs, information about the failure is typically transmitted to a monitoring center along with the information stored in the FRU memory device.

Referring to FIG. 1, a chassis identification system 100 is shown according to the prior art. A management entity 110 oversees a group of sensors in system 100. A chassis information device 122 is coupled to a bus 136 along with other miscellaneous sensors. Prior art FRU memory devices, however, have several disadvantages. First, there is no way for the information in the identification module to be copied to other non-volatile memory for preservation in case the identification module fails. Second, there are no redundant FRU memory devices in case the primary module fails. Third, the bus coupled to the identification module may cause the module to become inoperable should the bus fail for reasons that have nothing to do with the module itself. For these and other reasons, the prior art risks losing crucial chassis identity information so that a system administrator may not be able to determine which system is having a problem from potentially thousands of deployed unmanned systems.

DETAILED DESCRIPTION

Figure 1:
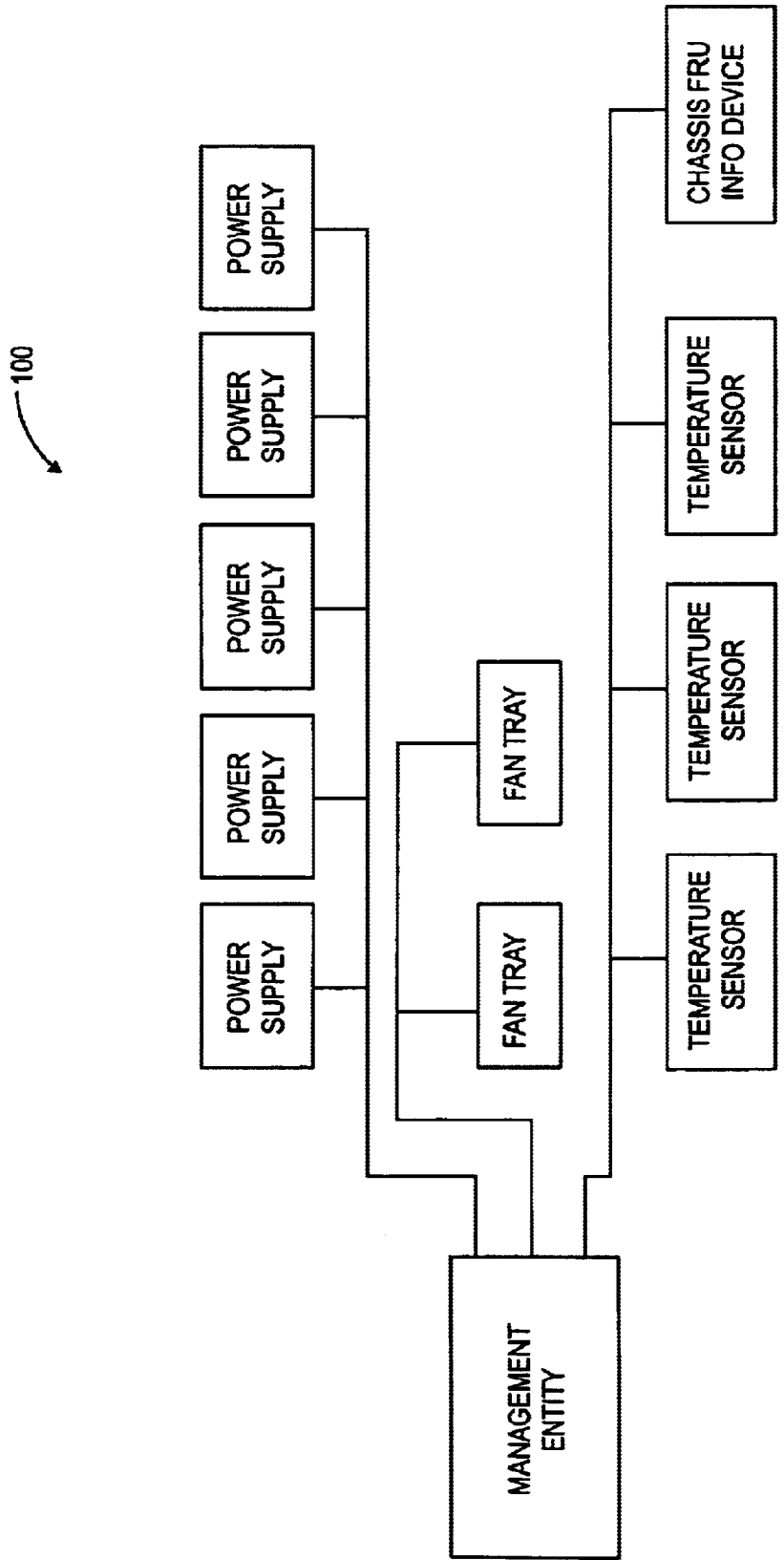
FIG. 1 is a block diagram illustrating a prior art chassis identification system.
Figure 2:
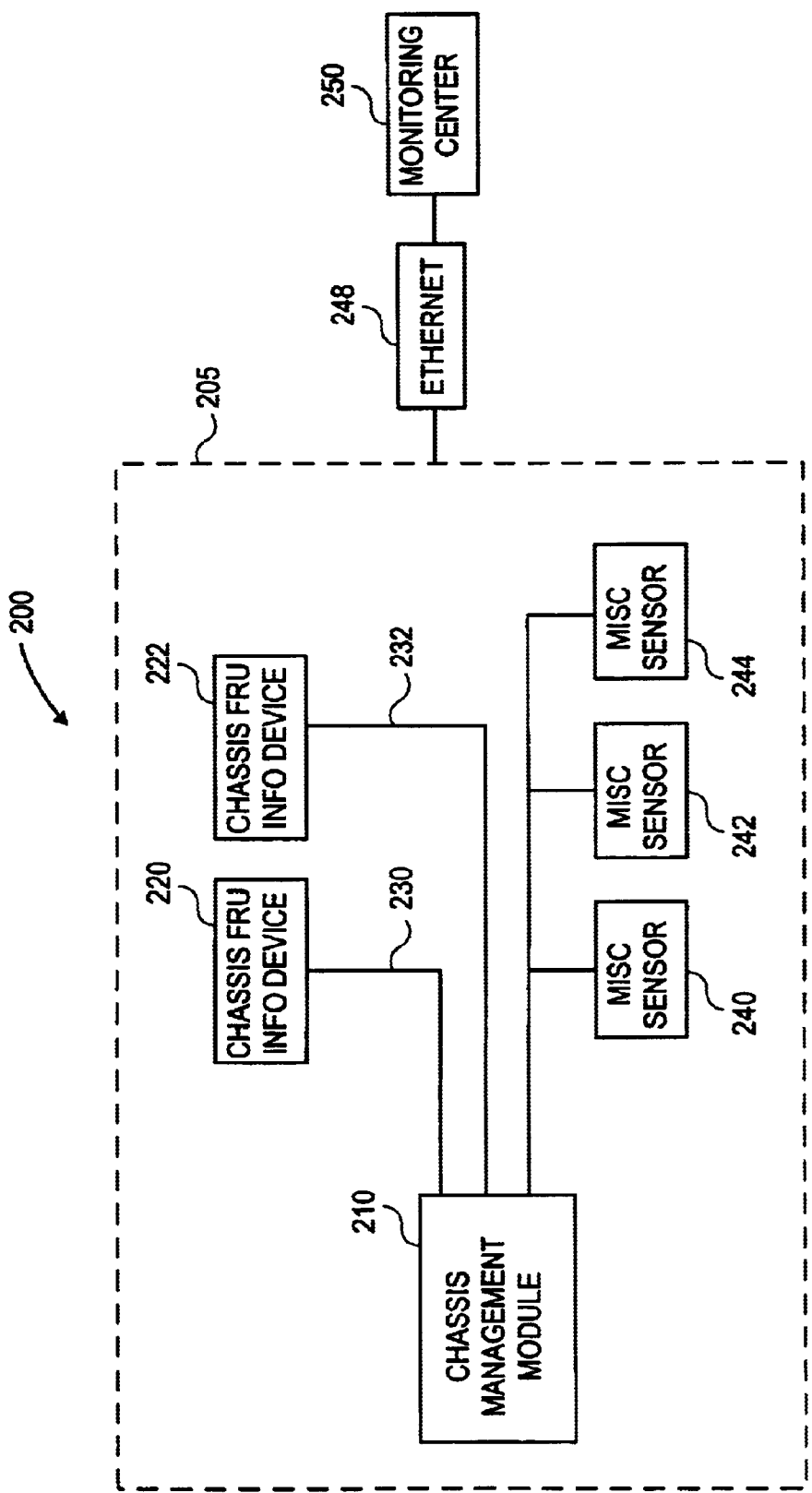
FIG. 2 is a block diagram illustrating a chassis identification system constructed in accordance with one embodiment of the invention.

Referring to FIG. 2, a chassis identification system 200 constructed in accordance with an embodiment of the invention is illustrated. System 200 shows a chassis 205 containing a chassis management module 210, two independent communication buses 230 and 232 for accessing FRU memory devices 220 and 222, and a third communication bus 236 for accessing miscellaneous sensors 240, 242, and 244. If devices 220 and 222 are functioning properly, when a component failure occurs unrelated to devices 220 and 222, the module 210 is configured to log the problem and read the chassis information data from devices 220 and 222 over buses 230 and 232. The module 210 is also configured to send the logged failure and chassis identification information to monitoring center 250 over an external Ethernet 248. If, however, devices 220 and 222 are not functioning properly, module 210 is configured to alert monitoring center 250 over external Ethernet 248 with any logged failures using the latest cached copy of the chassis identification data stored in cache 216. Included in the log will be the failure of the FRU memory devices. Although devices 220 and 222 are identified as field replaceable units, the embodiment is not limited by this fact in that any piece of hardware in chassis 205 can be made so that it is replaceable in the field; i.e., can be a field replaceable unit (FRU).

Chassis management module 210 is configured to read and manage the data stored in chassis FRU memory devices 220 and 222. Module 210 can be implemented in software, firmware, or hardware, such as a baseboard management controller, and is typically located on the main processor board or module. Module 210 also has non-volatile storage, such as, for example, flash memory 214 wherein resides a cache 216 having chassis FRU identification information data from devices 220 and 222. Memory 214 also stores a cache-might-be-stale flag 218. The cache-might-be-stale flag 218 is set to TRUE (i.e., the cache might be stale) at power up. Module 210 has a timer 212 that periodically alerts module 210 to poll devices 220 and 222 to make sure that they are functioning properly. The circuit boards in chassis 205 communicate internally to a backplane in chassis 205 over an internal Ethernet connection (not shown) that adheres to a standard described by PICMG 2.16, CompactPCI Packet Switching Backplane, approved and released Sep. 5, 2001.

If devices 220 and 222 are implemented using 2 kilobit SEEPROMs, the data can be allocated as follows: common header, 8 bytes; internal use area, 72 bytes; chassis information area, 32 bytes; board information area, 64 bytes; product information area, 80 bytes; and multi-record information area, a number of bytes determined by the application.

The common header holds information on overall format specification and offsets to other information areas. The internal use area provides information on other devices that exist on the same FRU. The chassis information area holds serial number, part number, and other information about the system chassis. The board information area holds serial number, part number, and other information about the board the FRU memory device is located on. The product information is present when the FRU exists as a separate product from the system chassis, such as, for example, when the FRU is an add-in card. The multi-record information area is a region that holds one or more records of information covering new information as specified in new industry standards or in proprietary standards.

Communication buses 230 and 232 serve to allow for communication of data between module 210 and devices 220 and 222. Buses 230 and 232 are independent of any other system buses and are coupled to one chassis FRU memory device in FIG. 2. The independence of buses 230 and 232 from other system buses gives FRU memory devices 220 and 222 greater probability of surviving a failure that may occur if another component was installed on the same bus. Although buses 230 and 232 are shown communicating with one FRU memory device, another embodiment of the invention can have more than one FRU memory device on a bus. Buses 230 and 232 can be implemented using single-wire and two-wire communication buses along with related interfaces and protocols, such as, for example, SMBus, IPMB, RS485, and I²C™ bus. (SMBus is the System Management Bus specification designed by Intel in 1995. See SMBus Specification Version 2, published Aug. 3, 2000. IPMB is the Intelligent Platform Management Bus specification, which is one of three specifications comprising IPMI, and set forth in the IPMB Specification, version 1.0, published Nov. 15, 1999. RS485 refers to the Electronics Industry Association (EIA) standard RS485 (ISO 8482) specification, and I²C™ is an Inter-Integrated Circuit bus specification developed by Philips Semiconductors. See "The I²C bus and how to use it (including specifications)", August 1995 Update, published by Philips Semiconducutors.

Other buses 236 in system 200, independent of buses 230 and 232, will have sensors 240, 242, and 244 coupled to them as determined by the particular application for system 200. Sensors 240, 242, and 244 can be, for example, temperature sensors, or other sensors to used to monitor the health of chassis 205. Miscellaneous sensors 240, 242, and 244 can be implemented using any number of devices having interfaces compatible with the buses used in chassis 205.

Chassis FRU memory devices 220 and 222 store chassis information data and are located in a place on the chassis that is not easily accessible by a technician so that devices 220 and 222 cannot be accidentally swapped with other FRU memory devices having the wrong chassis identity. Devices 220 and 222 are implemented using Serial Electrically Erasable Programmable Read Only Memory (SEEPROM) and are individually coupled to buses 230 and 232 using interfaces known to those of ordinary skill in the art.

Figure 3:
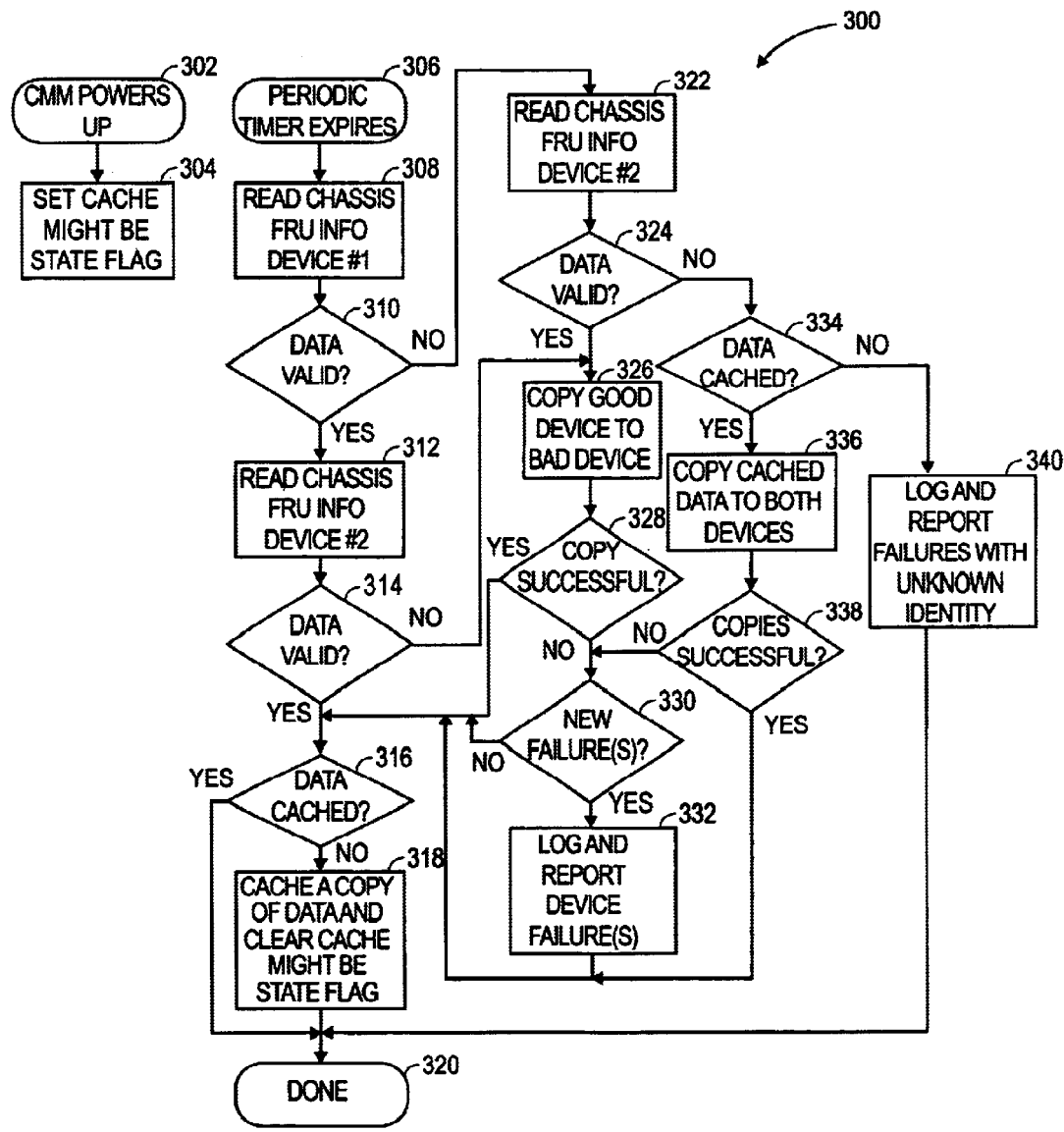
FIG. 3 is a flow diagram illustrating a method of operating the chassis identification system of FIG. 2 in accordance with an embodiment of the invention.

Referring to FIG. 3, a method of operating the system 200 is illustrated. In blocks 302 and 304, power is applied to chassis management module 210 and a cache-might-be-stale flag 218 is set to TRUE. Applying power to module 210 also starts a hardware timer 212 that periodically polls FRU memory devices 220 and 222.

In blocks 306 and 308, the timer 212 expires and module 210 performs a read operation on FRU memory device 220. If the read operation for device 220 is successful, the fitness of the data stored in device 220 is checked in decision block 310 using a checksum algorithm or a cyclic redundancy check (CRC) algorithm performed on the data read out of device 220. If the data from device 220 is successfully read and the data is good, the data is certified as valid. Note that henceforth "valid" data means that the data has been successfully read and has passed the data check operation. "Invalid" data means that either the data has not been successfully read or the data did not pass the data check operation. Module 210 next performs a read operation on device 222 as shown in block 312.

In decision block 314 the data from device 222 is tested for validity. If the data is valid, module 210 checks to determine if a copy of the data stored in devices 220 and 222 have been cached in flash memory 214 so that identification data can be retrieved should devices 220 and 222 fail. If the data has not been cached or the cache-might-be-stale flag 218 is TRUE, the data is cached in block 318 and the cache-might-be-stale flag 218 is set to FALSE. If the data has been cached and the cache-might-be-stale flag 218 is FALSE, the method completes in result block 320 and will restart when the timer 212 informs module 210 that it is time to poll the FRU memory devices again. Note that, henceforth, "cached" data is data that has been cached in flash memory 214 and the cache-might-be-stale flag 318 is FALSE. "Uncached" data means that either the data has not been cached in flash memory 214 or the cache-might-be-stale-flag 318 is TRUE. Chassis identification data is labeled as "uncached" even though data resides in cache 216 if the cache-might-be-stale-flag 318 is TRUE because this data might be stale and incorrect. Unless a fresh, valid copy of data is in cache 216, chassis identification data is deemed to be "uncached."

Referring back to decision block 310, if the data from device 220 is invalid, the method proceeds to block 322 where a data read operation is attempted on device 222. The validity of the data is checked in decision block 324. If the data is valid, in block 326, module 210 copies the data from device 222 into device 220. If the copy is successful in decision block 328, the method goes to decision block 316 and timer 212 resets.

If the copy in decision block 328 is not successful, the method proceeds to decision block 330 where module 210 checks to see if this failure has already been logged in the system 200. If this is a new failure, in block 332 the failure is logged and reported to monitoring station 250. If the failure has already been logged, the method goes to decision block 316 and timer 212 is reset.

Referring back to decision block 324, if the data from device 222 is invalid, in decision block 334 the data is checked to see if it has been cached. If it is cached, the cached data is copied to both device 220 and device 222. If the copy is successful, the method proceeds to decision block 316. If the copy is unsuccessful the method proceeds to decision block 330.

Referring back to decision block 334, if the data is uncached, the failure of devices 220 and 222 is logged in block 340 with unknown chassis identity. Referring back to decision block 314, if the data from device 222 is invalid, the method goes to block 326, where data is copied from device 220 to device 222.

Thus, a system and method for chassis identification has been described. While the method and system of the invention has been described in terms of the above illustrated embodiments, those skilled in the art will recognize that the invention is not limited to the embodiments described. The invention can be practiced with modification and alteration within the spirit and scope of the appended claims. The description is thus to be regarded as illustrative instead of restrictive on the invention.

What is claimed is:

1. A method comprising:
reading redundant identification data from a first memory device coupled to an independent communication bus; and
managing the identification data read from the first memory device;
determining whether the redundant identification data from the first memory device is valid; and
if a component failure occurs, logging the component failure with identification data from either memory device.

2. The method of claim 1, further comprising:
if the identification data from the first memory device is valid and the identification data from the second memory device is not valid, copying the identification data from the first memory device to the second memory device.

3. A method comprising:
reading redundant identification data from a first memory device coupled to an independent communication bus; and
managing the identification data read from the first memory device;
determining whether the redundant identification data from the first memory device is valid; and
if the copying of identification data from the first memory device to the second memory device fails, logging the copy failure with identification data.

4. The method of claim 3, further comprising:
if a component failure occurs, logging the failure with identification information from the first memory device.

5. A method comprising:
reading redundant identification data, with a chassis management module, from a first memory device coupled to an independent communication bus; and
managing the identification data read from the first memory device;
determining whether the redundant identification data from the first memory device is valid;
if the identification data from the first memory device is not valid and if the identification data, read by the chassis management module, from the second memory device is valid, copying the identification data from the second memory device to the first memory device; and
if a component failure occurs, logging the failure with identification information from the second memory device.

6. A method comprising:
reading redundant identification data from a first memory device coupled to an independent communication bus; and
managing the identification data read from the first memory device;
determining whether the redundant identification data from the first memory device is valid; and
if the identification data from the first memory device is not valid and the identification data from the second memory device is not valid, checking to determine if the identification data was cached.

7. The method of claim 6, further comprising:
if the identification data was cached, copying cached identification data to both the first and second memory devices;
if the copy is successful, logging a component failure with the cached identification data;
if the copy fails or if the identification data was not cached, logging a component failure with a marker indicating unknown identification information.

8. An apparatus comprising:
means for reading redundant identification data from a first memory device coupled to an independent communication bus; and
means for managing the identification data read from the first memory device;
means for determining whether the redundant identification data from the first memory device is valid; and
means for logging a component failure, if any, with identification data from either memory device.

9. The apparatus of claim 8, further comprising means for copying the identification data from the first memory device to the second memory device if the identification data from the first memory device is valid and the identification data from the second memory device is not valid.

10. An apparatus comprising:
means for reading redundant identification data from a first memory device coupled to an independent communication bus; and
means for managing the identification data read from the first memory device;
means for determining whether the redundant identification data from the first memory device is valid; and
means for logging the copy failure with identification data if the copying of identification data from the first memory device to the second memory device fails.

11. The apparatus of claim 10, further comprising means for logging the failure with identification information from the first memory device if a component failure occurs.

12. An apparatus comprising:
means for reading redundant identification data, with a chassis management module, from a first memory device coupled to an independent communication bus; and
means for managing the identification data read from the first memory device;
means for determining whether the redundant identification data from the first memory device is valid;

means for copying the identification data from the second memory device to the first memory device if the identification data from the first memory device is not valid and if the identification data, read by the chassis management module, from the second memory device is valid; and means for logging the failure with identification information from the second memory device if a component failure occurs.

13. An apparatus comprising:

means for reading redundant identification data from a first memory device coupled to an independent communication bus; and means for managing the identification data read from the first memory device;

means for determining whether the redundant identification data from the first memory device is valid; and means for checking to determine if the identification data was cached if the identification data from the first memory device is not valid and the identification data from the second memory device is not valid.

14. The apparatus of claim 13, further comprising:

means for copying cached identification data to both the first and second memory devices if the identification data was cached;

means for logging a component failure with the cached identification data if the copy is successful;

means for logging a component failure with a marker indicating unknown identification information if the copy fails or if the identification data was not cached.

15. A system comprising:

a first memory device;

a second memory device;

control circuitry coupled with the first memory device and the second memory device to read redundant identification data from the first memory device via a first independent communication bus and to determine whether the redundant identification information from the first memory device is valid, the control circuitry further to log a copy failure with identification data if copying of identification data from the first memory device to the second memory device fails.

16. The system of claim 15 wherein the control circuitry further configured to log the failure with identification information from the first memory device if a component failure occurs.

* * * * *